United States Patent
Betti et al.

(10) Patent No.: US 6,868,958 B2
(45) Date of Patent: Mar. 22, 2005

(54) DEVICE FOR ELIMINATING THE FRONT AND END TRIMMINGS FROM SERIES OF ROLLS AND FOR SORTING THE ROLLS

(75) Inventors: Giulio Betti, Lucca (IT); Angelo Benvenuti, Lucca (IT); Mario Gioni Chiocchetti, Lucca (IT)

(73) Assignee: Fabio Perini, S.p.A., Lucca (IT)

( * ) Notice: Subject to any disclaimer, the term of this patent is extended or adjusted under 35 U.S.C. 154(b) by 18 days.

(21) Appl. No.: 10/203,471

(22) PCT Filed: Feb. 20, 2001

(86) PCT No.: PCT/IT01/00078

§ 371 (c)(1), (2), (4) Date: Aug. 12, 2002

(87) PCT Pub. No.: WO01/62635

PCT Pub. Date: Aug. 30, 2001

(65) Prior Publication Data

US 2003/0015077 A1 Jan. 23, 2003

(30) Foreign Application Priority Data

Feb. 23, 2000 (IT) ...................................... FI2000A0039

(51) Int. Cl.[7] .............................................. B65G 47/68
(52) U.S. Cl. ..................... 198/435; 198/418.7; 198/438
(58) Field of Search ............................. 198/435, 418.7, 198/438; 83/104

(56) References Cited

U.S. PATENT DOCUMENTS

| | | | |
|---|---|---|---|
| 3,757,926 | A | 9/1973 | Gendron et al. |
| 4,033,862 | A | 7/1977 | Spencer |
| 4,265,361 | A | 5/1981 | Schroeder |
| 5,385,226 | A | 1/1995 | Weinert |
| 5,458,033 | A | 10/1995 | Wierschke |
| 5,475,917 | A | 12/1995 | Biagiotti |

FOREIGN PATENT DOCUMENTS

| | | |
|---|---|---|
| EP | 0 827 920 A2 | 3/1998 |
| EP | 0 827 920 A3 | 2/1999 |
| GB | 1 485 137 | 9/1977 |

*Primary Examiner*—Donald P. Walsh
*Assistant Examiner*—Kaitlin Joerger
(74) *Attorney, Agent, or Firm*—Breiner & Breiner, L.L.C.

(57) ABSTRACT

The device for removing front and end trimmings in a series of aligned rolls comprises: at least one continuous flexible suction conveyor (13); a suction system (3) associated with the conveyor so as to generate a suction through openings (13A) in the conveyor; a device for eliminating trimmings along a roll transfer path; a device receiving rolls from the conveyor. The receiver comprises at least two alternate paths for the rolls, which are arranged in sequence along the conveyor (13) and onto which the rolls may be alternately sorted.

15 Claims, 9 Drawing Sheets

DEVICE FOR ELIMINATING THE FRONT AND END TRIMMINGS FROM SERIES OF ROLLS AND FOR SORTING THE ROLLS

DESCRIPTION

1. Technical Field

The present invention relates to a device for removing front and end trimmings from series of aligned rolls obtained, for example, by transversely cutting logs of wound web-like material.

Devices of this kind are commonly used in the paper converting industry in order to eliminate the trimmings before packaging of the rolls of paper material, such as rolls of toilet paper, paper towels and the like.

2. State of the Art

In the production of rolls of wound web-like material, for example rolls of toilet paper, paper towels or other paper material, winding of the web-like material into so-called logs, i.e. rolls with a diameter equal to that of the finished rolls and with a considerable axial length, is performed. The latter are then cut perpendicularly to their axis by means of so-called saw machines. During cutting of the logs, a front trimming and an end trimming are generated and must be eliminated before the subsequent roll-packaging operation and possibly recycled.

In order to eliminate the trimmings, various devices of a mechanical type have been developed. More recently, devices which perform elimination of the trimmings from the series of cut rolls with the aid of pneumatic means have been developed.

An example of a pneumatic device for eliminating trimmings is described in U.S. Pat. No. 5,475,917. In one of the embodiments described in this publication, the front and end trimmings of the series of rolls cut from the logs and subsequently fed to the device are eliminated by interrupting in a suitable zone the suction exerted by a flexible suction conveyor which removes the rolls from a feeder and transfers them to a receiver. By suitably positioning and dimensioning the non-sucking zone and using a conveyor of suitable length, it is possible to ensure that the front and end trimmings are always located in the position where the suction through the conveyor is interrupted.

Another system for eliminating the trimmings based on the use of pneumatic means in combination with mechanical means is described in U.S. Pat. No. 5,458,033. This system envisages a suction conveyor divided into three portions, a central portion and two side portions, which may be staggered with respect to each other.

In the production and packaging of rolls of wound strip-like material there also exists the need to sort the rolls onto separate conveyors depending on the specific requirements during the processing phase. U.S. Pat. No. 4,033,862 describes a sorting device which is able to receive, at its input, a series of rolls from which the trimmings have already been eliminated, in order to distribute them in accordance with a predetermined criterion on a series of conveyors arranged in succession. This device is not able to eliminate the trimmings.

OBJECTS AND SUMMARY OF THE INVENTION

The object of the present invention is to provide a device for removing the front and end trimmings in a series of aligned rolls, for example rolls of paper or other web-like material, obtained by cutting the logs, which also allows sorting of the rolls to be performed.

This and further objects and advantages, which will become clear to persons skilled in the art from reading the text which follows, are obtained with a device in which a conveyor associated with a system for retaining the rolls transfers the rolls, once the trimmings have been eliminated from them, onto a receiver which comprises at least two alternate paths arranged in sequence along the conveyor itself and in which the conveyor is equipped with a sorting system for releasing the rolls alternately to either one of the paths of the receiver.

In a practical embodiment, the conveyor is a suction conveyor associated with a retaining system of the suction type for retaining the rolls. As a result it is possible to obtain a compact device and a particularly simple and low-cost configuration of the sorting means which allow transfer of the rolls to either one of the alternate paths. Elimination of the trimmings is also obtained in a simple manner.

The conveyor with the associated suction system may be positioned so as to be arranged above the rolls which are fed to it, so as to retain the latter from above. However, this is not strictly necessary since the pneumatic grip exerted by the suction means may also be oriented non-vertically, provided that it is opposed by the force of gravity, due to the effect of which the trimmings are discharged. For example, the conveyor may be located laterally with respect to the rolls.

In a practical embodiment, the suction system associated with the conveyor comprises at least one first and one second suction member. The two suction members are arranged in series along the extension of the conveyor and the sorting system acts at least on the second suction member arranged downstream of the first suction member with respect to the direction of advancing movement of the conveyor, so as to activate or deactivate alternately the second suction member. In this way, when it is required to sort the rolls from the device for removing the trimmings onto the first of the alternate paths (i.e. onto the path which is first encountered by the rolls fed by the conveyor) the second suction member is deactivated. In this way, the rolls are necessarily released by the conveyor to the first of the said alternate paths. When it is desired to release the rolls onto the second alternate path encountered during the advancing movement of the conveyor, the second suction member is activated, such that the rolls are retained by the conveyor until they reach the point where they may be released to the second alternate path.

The idea explained above may be extended to a configuration with more than two alternate paths and consequently with more than two suction members arranged in succession along the roll conveyor. In any case, the rolls will be released to that path of the receiver which is located immediately downstream (with respect to the direction of advancing movement of the rolls) of the last active suction member.

The various suction members may consist of successive portions of a wall along which the conveyor travels. The wall portion furthest downstream—corresponding to the suction member which must be deactivated when the rolls must be released to the first alternate path—has, associated with it, an intercepting member for intercepting the suction through this wall portion. When there are more than two alternate paths, the wall portions along which the conveyor travels and which may be equipped with intercepting members are at least equal to the total number of alternate paths less one. Each intercepting member may be actuated independently of the others.

According to a particularly advantageous embodiment of the invention, the suction system comprises a suction box with a wall or walls along which the conveyor travels. Suction openings are formed along the wall or walls and are divided into a number of groups corresponding to the number of alternate paths along which the rolls fed by the conveyor may be discharged. The various wall portions, with the exception, where applicable, of the first one, are equipped with suitable intercepting members. In practice, the suction box may be single and interception of the openings of the second group of openings is obtained by simply actuating an intercepting system, for example a laminar valve. However, according to a preferred embodiment, the suction box is divided into a number of chambers corresponding to the number of alternate paths provided in the roll receiver. In this case the first chamber may be constantly in communication with the respective series of openings of the first group. In the second chamber, and where applicable in each successive chamber, a respective intercepting member for intercepting the suction through the respective openings is provided.

In general, interception may occur by means of a valve or a tap on a suction duct which connects the suction chamber to a suction device or equivalent. In practice, however, in order to accelerate the response of the system to actuation of the intercepting member, the latter is advantageously formed by a laminar valve which slides over the openings of the respective chamber or using some other equally rapid operating system.

In this way immediate interception or opening of the suction in the respective group of openings is obtained.

In the detailed description which follows, a specific and particularly advantageous system for eliminating the trimmings, resulting in a versatile and compact device, is described. It must be understood, however, that the specific type of system for eliminating the trimmings and its structural and functional characteristics are not critical for the realization of the present invention. The trimmings may be eliminated also using means different from the specific means described, for example using a system of the type known from the state of the art or other equivalent system. Solely the presence of a suction system for gripping the rolls is of relevance for the purposes of the present invention.

Further advantageous features and embodiments of the device according to the invention are indicated in the accompanying dependent claims.

BRIEF DESCRIPTION OF THE DRAWINGS

The invention will be better understood with reference to the description and the accompanying drawing, which shows a practical non-limiting example of said invention. In the drawing.

DETAILED DESCRIPTION OF AN EMBODIMENT

Figure 1:
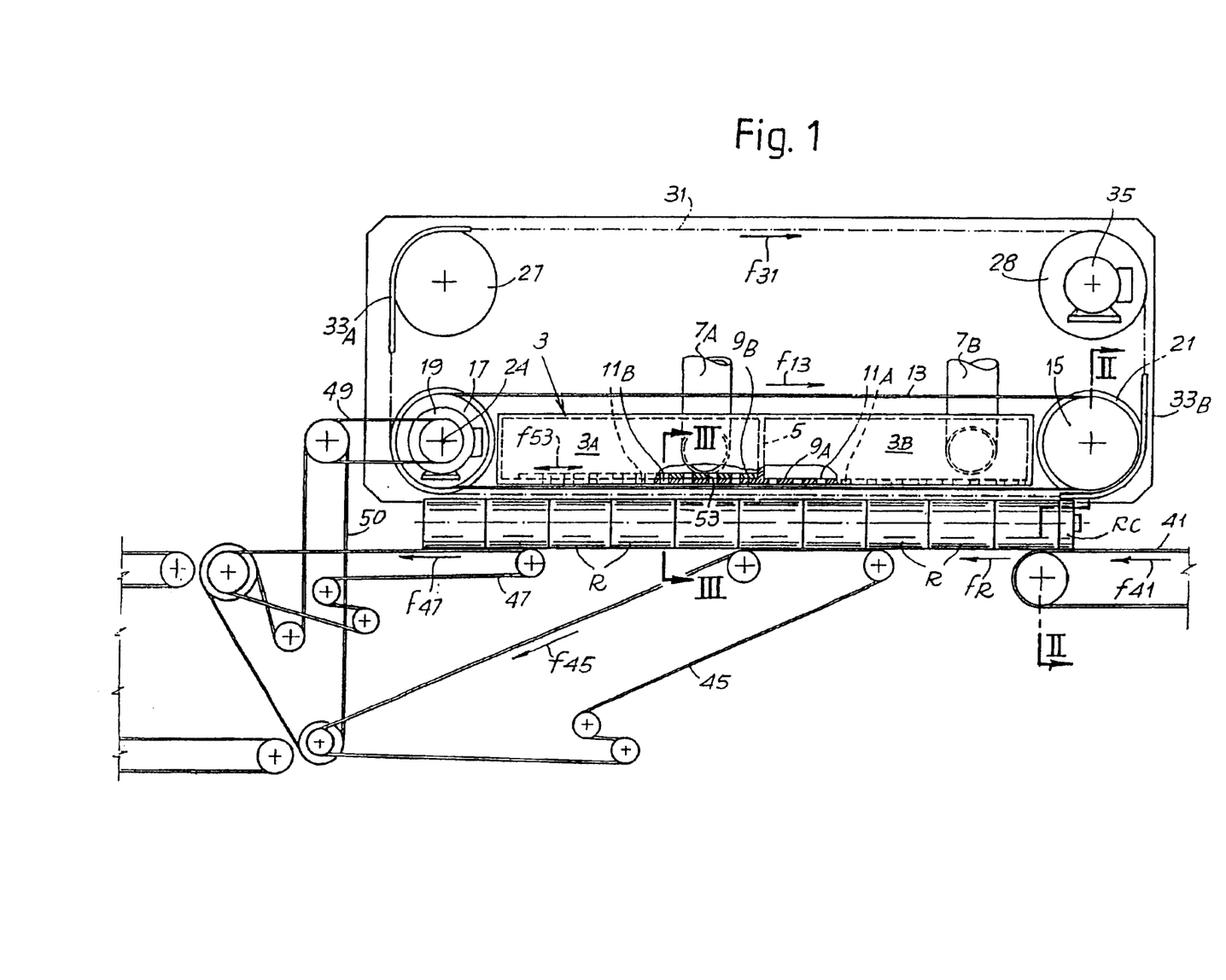
FIG. 1 shows a side and partially sectioned view of the device in a first operating condition.

The device comprises a pair of side walls 1, between which a suction box 3 divided into two chambers 3A and 3B by a separation baffle 5 is arranged. The chamber 3A is connected to a suction duct 7A, while the chamber 3B is connected to a suction duct 7B. The separation baffle 5 may be omitted and the suction duct may be single instead of double. 9 denotes the end wall of the suction box 3, which wall is divided into two portions 9A and 9B corresponding to the chambers 3A and 3B into which the suction box is divided. Openings 11A are formed in the wall 9A, while openings 11B are formed in the wall portion 9B.

Figure 2:
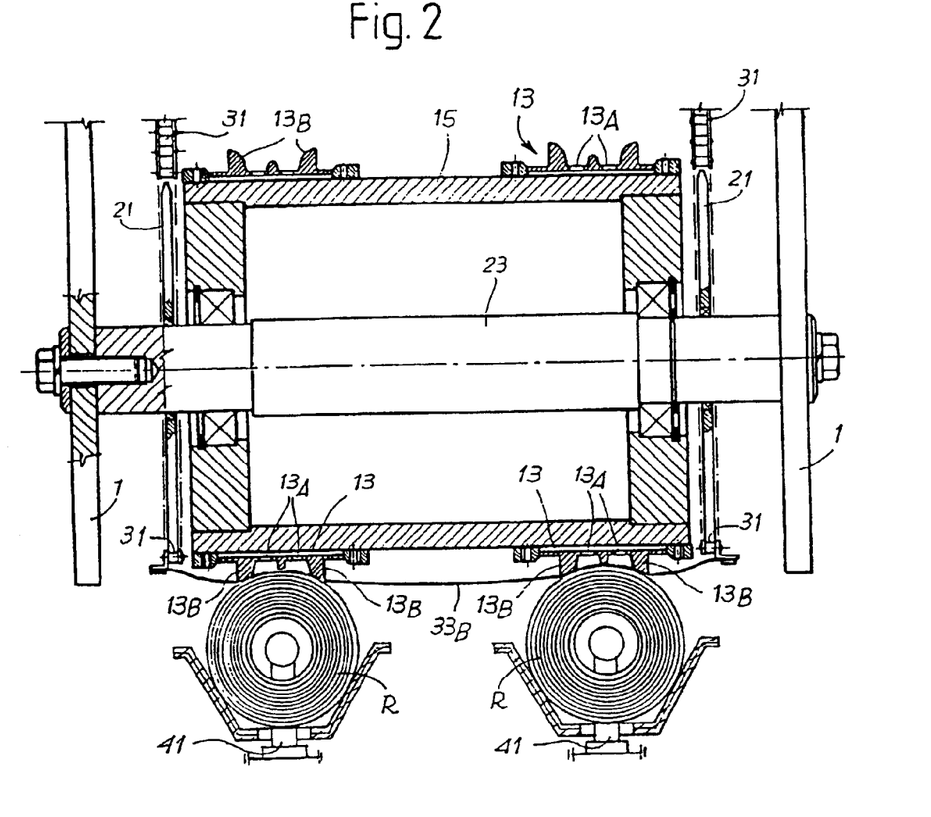
FIGS. 2 and 3 show local cross sections along II—II and III—III in FIG. 1.
Figure 3:
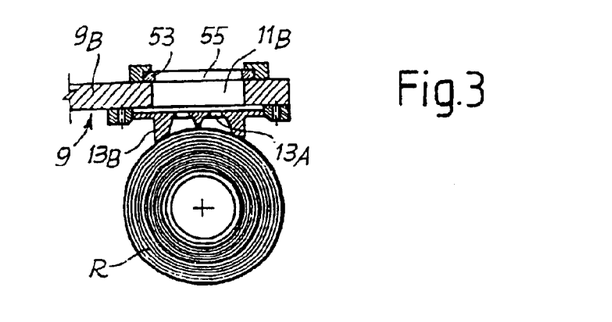

One or more flexible conveyors 13 travel along the bottom surface of the wall 9. The number of flexible conveyors 13 (two in the example illustrated) corresponds to the number of roll feed channels. The two conveyors 13 are arranged parallel to each other, as shown in the cross section in FIG. 2, and are arranged so as to receive simultaneously two rows of rolls supplied from a two-channel saw machine (not shown).

The flexible conveyors 13 are driven around a first idle roller 15 and a second motorized roller 17. The roller 17 receives the movement from a motor which, in the example illustrated, is indicated by 19 and arranged coaxially with the roller 17.

Each flexible conveyor 13 has openings 13A which extend along its whole extension. The openings 13A are flanked by lips 13B which also extend along the whole extension of the conveyor 13. In the bottom zone of the path of the conveyors 13, where the latter make contact with the bottom surface of the wall 9 of the suction box 3, a suction obtained by means of the vacuum generated inside the chambers 3A and 3B is produced through the openings 13A. In a manner known per se, the suction exerted through the openings 13A has the function of retaining the rolls fed to the conveyors 13 in the manner which will be described below.

Chain wheels 21 are also supported idle, by means of suitable bearings, on the shaft 23 on which the roller 15 is supported. Similar chain wheels are mounted on the shaft 24 supporting the roller 17. Assembly is such that the motor 19 which causes rotation of the roller 17 does not act on the chain wheels mounted on said shaft 24, the latter wheels being supported idle and thus being able to be actuated with an actuator different from and independently of the motor 19. Another two pairs of chain wheels, denoted by 27 and 28, are also mounted between the side walls 1.

Respective chains 31 are driven around the chain wheels and extend along a closed path, the bottom section of which is approximately parallel to the path of the conveyors 13 in the zone where the latter make contact with the external surface of the bottom wall 9 of the suction box 3.

Two membrane obturators 33A and 33B which are impermeable to air extend between the two chains 31 which are parallel to each other. The two membrane obturators 33A and 33B are located in two opposite positions along the path of the chains 31.

The movement of the chains 31, and therefore of the associated membrane obturators 33A and 33B, is obtained by means of a motor 35 associated with one of the shafts of the chain wheels, in the case illustrated with the shaft on which the chain wheels 28 are keyed.

The movement of the chains 31 is indicated by the arrow f31, while that of the conveyors 13 is indicated by the arrow f13.

A roll feeder 41 is located in the inlet zone of the device. The rolls R are fed in series, each series having a front trimming RT and an end trimming RC representing the portions of surplus material which must be eliminated by means of the device described. The feeder 41 is generally shown as a continuous conveyor, but may assume any suitable form and may be suitably equipped with thrusters which facilitate feeding of the series of rolls. The arrangement is known per se and various alternatives are available for the person skilled in the art.

The device also comprises a roll receiver consisting, in the example illustrated, of two alternative paths defined by a first flexible conveyor member 45 and by a second flexible conveyor member 47. The flexible conveyor members 45 and 47 are actuated by the same motor 19 which operates the conveyors 13, by means of a belt drive 49, 50.

Each of the flexible conveyor members 45, 47 has, in the example illustrated, at least one section approximately parallel to the bottom wall 9 of the suction box 3 and therefore to the respective section of the conveyors 13 making contact with the external surface of said wall 9. The arrangement of the flexible conveyor members 45, 47 with respect to the conveyors 13 is such that, along the feed path of the rolls R transported in the direction of the arrow fR by the conveyors 13, said rolls encounter firstly the flexible conveyor member 45 and only subsequently the flexible conveyor member 47.

A laminar valve 53 equipped with openings 55 and capable of moving in an alternating manner in the direction of the double arrow f53 so as to cause, respectively, the openings 55 to communicate with the openings 11B or be staggered with respect to the latter is arranged inside the chamber 3B of the suction box 3. For this purpose, the openings 55 and 11B have substantially the same amplitude and a similar shape. The laminar valve 53 therefore allows the openings 11B to communicate with the chamber 3B or to intercept said openings 11B, interrupting the suction through them, effected via the duct 7B.

Figure 4:
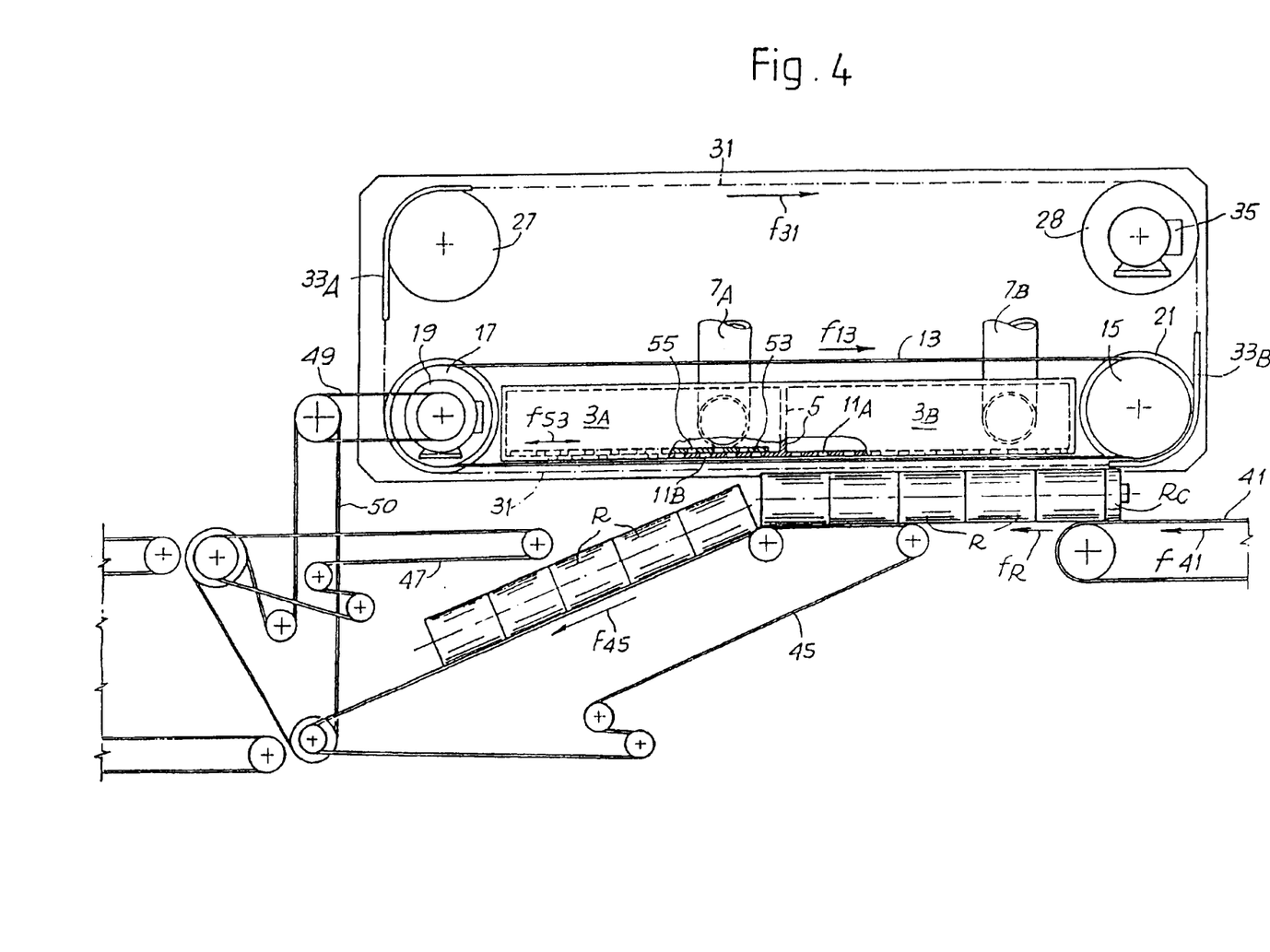
FIGS. 4 to 6 show three successive operating phases of the device during elimination of the trimmings.
Figure 5:
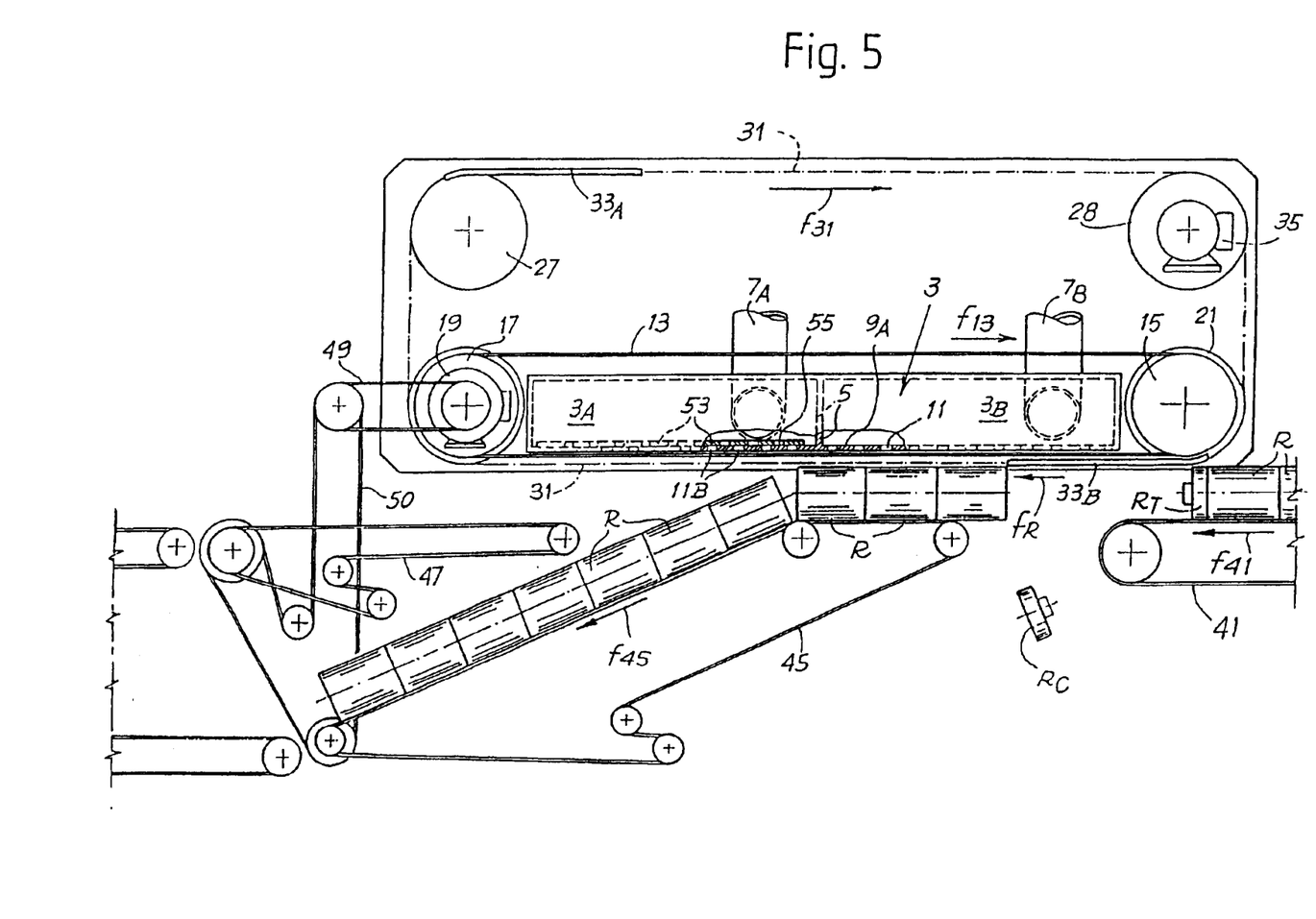
Figure 6:
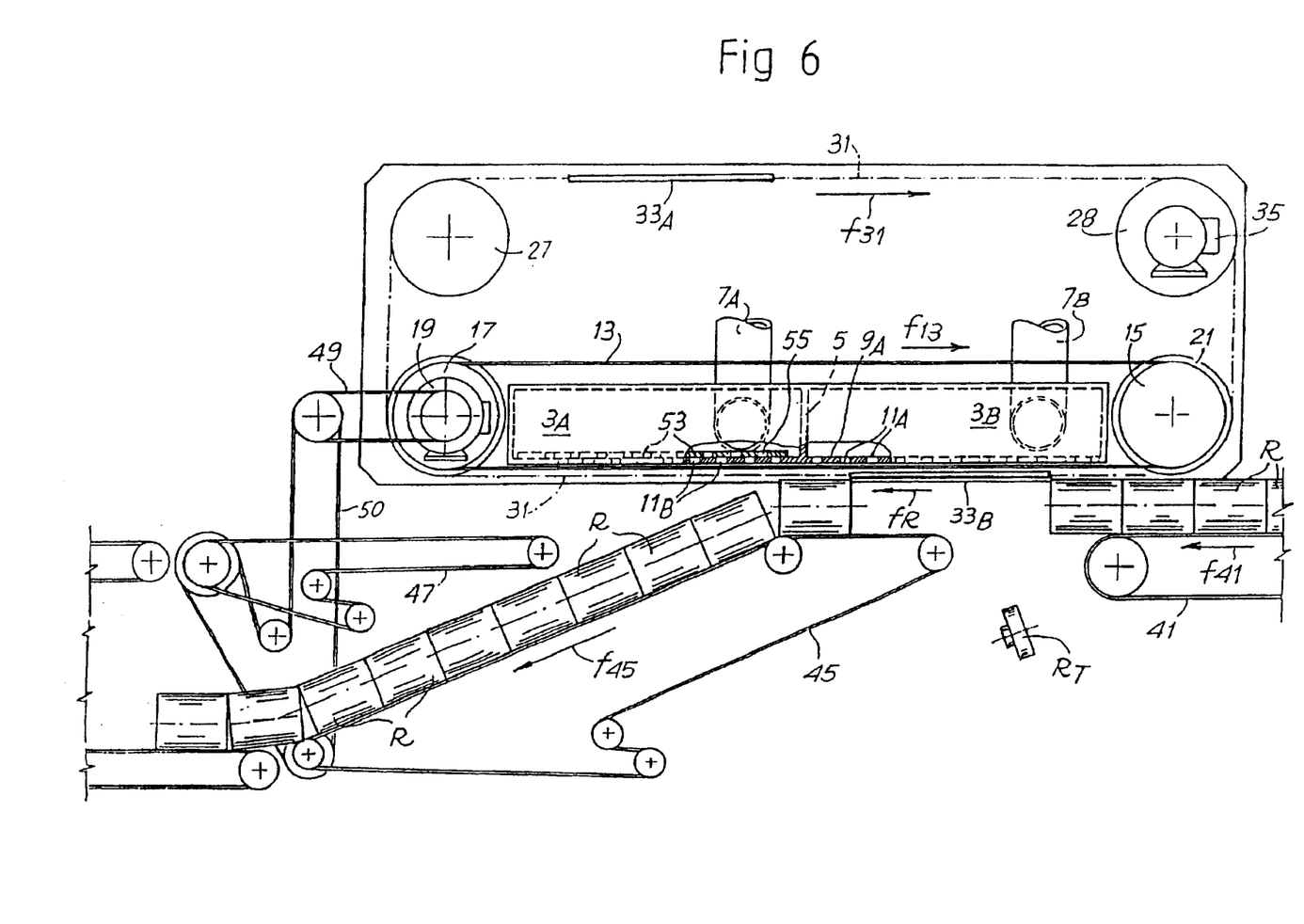

Operation of the device described hitherto is as follows (see in particular FIGS. 4 to 6).

The feeder 41 feeds series of rolls R underneath the bottom section of the conveyor 13. Since the feeder 41 extends right underneath the suction box 3 and since it is positioned so that the fed rolls R are located with their upper part making contact with the lips 13B of the respective conveyor 13, the suction generated through the openings 13A of the conveyors 13 retains the rolls which form a seal against said lips 13B. Consequently, the rolls R are transferred in the direction of the arrow fR toward the receiver.

If the laminar valve 53 is located in a position such as to close the openings 11B in the portion 9B of the wall 9 corresponding to the suction chamber 3B, the suction and therefore the retaining effect on the rolls R ceases opposite the first flexible conveyor member 45. Consequently, the rolls R are released to the flexible conveyor member 45 and further conveyed in the direction of the arrow f45 toward following processing stations. This is the situation illustrated in FIGS. 4 to 6.

If, on the other hand, the laminar valve 53 is in a position such as to keep the openings 11B open and in communication with the suction chamber 3A, the retaining effect due to suction on the rolls R is maintained as far as the end zone of the suction box 3, opposite the flexible conveyor member 47. The rolls R are in this case released by the conveyor 13 to the flexible conveyor member 47 which transfers them in the direction of the arrow f47 toward a further processing station. This is the situation illustrated in FIG. 1.

Elimination of the front and end trimmings is obtained as follows (FIGS. 4 to 6): the position of the end trimming RC of a first series of rolls and the front trimming RT of the following series is known from the data supplied by the saw machine arranged upstream of the device (and not shown). It is therefore possible, by means of the motor 35, to cause the movement of the chains 31 and the membrane obturators 33A and 33B so that one of the two obturators 33A, 33B is arranged between the bottom section of the conveyors 13 and the end trimming RC and front trimming RT when the latter are positioned by the feeder 41 underneath the suction box 3. In this embodiment, the distance between the trimmings RC and RT corresponds approximately to the length of the obturators 33A, 33B. Consequently, the retaining suction effect is not exerted on the trimmings RC and RT, which fall toward a collection zone in the space between the terminal end of the feeder 41 and the start of the flexible conveyor member 45. A container or a suitable conveyor (not shown) collect and/or convey away the trimmings.

The movement of the chains 31 and consequently the obturators 33A, 33B continues—at the same speed as the conveyors 13—until the obturator which has intercepted the suction opposite the trimmings just discarded is positioned beyond the suction box 3. From this position, the membrane obturators 33A, 33B will be displaced by means of movement of the chains 31 so as to be positioned for subsequent operation in order to eliminate successive front and end trimmings. The presence of two obturators allows one or other of the two obturators to be used alternately, resulting in more rapid positioning of said obturators in preparation for operation thereof.

FIGS. 7 to 10 show, in three different and successive operating conditions, a modified embodiment of the invention. Similar numbers indicate parts which are the same as or correspond to those in the previous embodiment. The device as claimed in FIGS. 7 to 9 differs from the previous device in that two pairs of chains 31A, 31A and 31B, 31B, which are driven around respective chain wheels and which are visible in particular in the cross section shown in FIG. 10 (equivalent to the cross section shown in FIG. 2), are provided. A first membrane obturator 33X is attached to the chains 31A driven around the wheels 21A and the wheels 19A, 27A and 28A, while a second membrane obturator 33Y is attached to the chains 31B. The two pairs of chains 31A, 31A and 31B, 31B are actuated by independent motors denoted by 35A and 35B in FIGS. 7 to 9. In this way, the two pairs of chains and consequently the two membrane obturators may be displaced along the path defined by said chains in an independent manner by means of the two motors. As a result, it is possible to obtain certain advantages which will emerge clearly from the description of operation, with reference to FIGS. 7 to 9.

Figure 7:
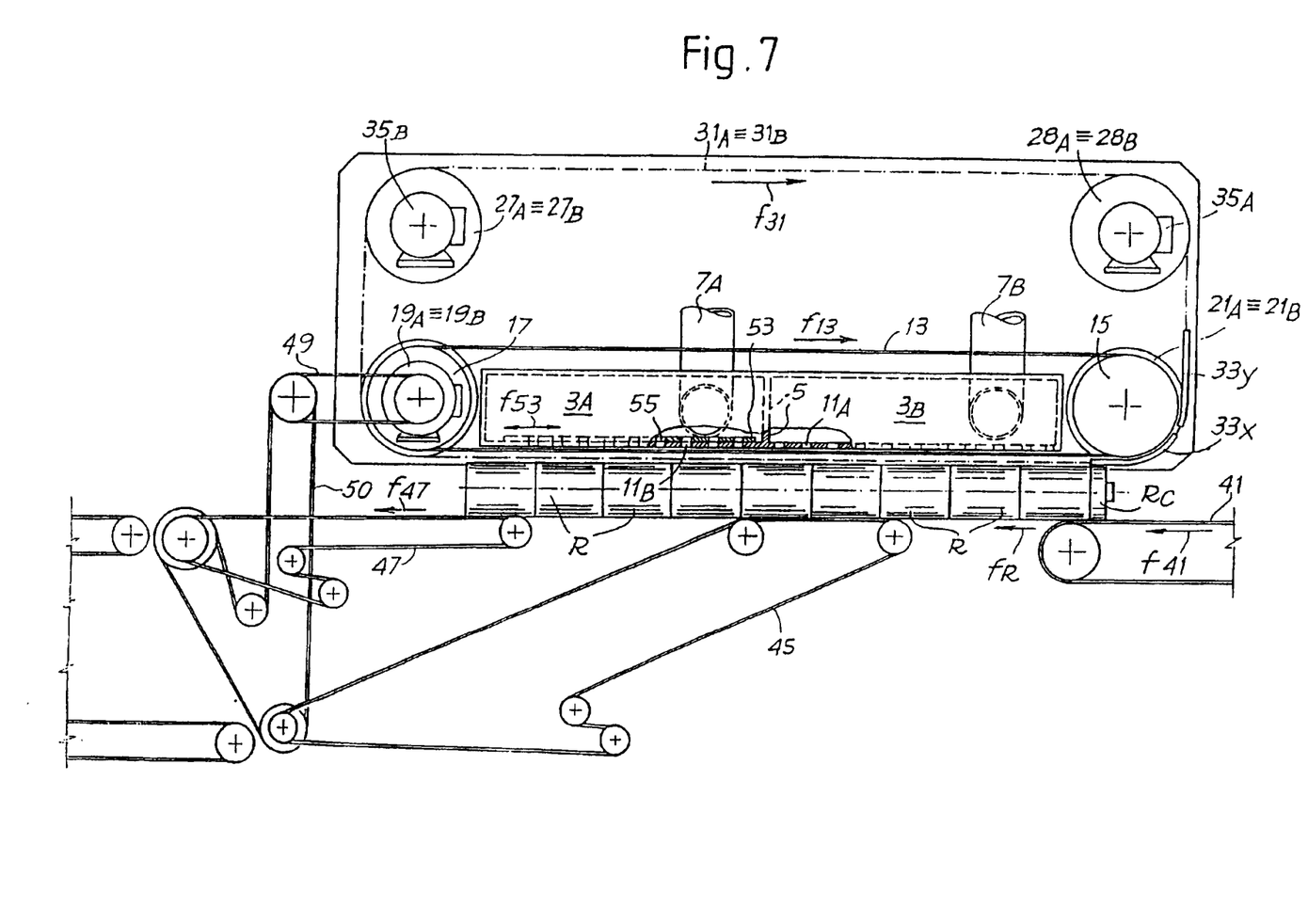
FIGS. 7 to 10 show three successive operating phases of a modified form of the device during elimination of the trimmings and a cross section of the modified device, similar to the cross section in FIG. 2.
Figure 8:
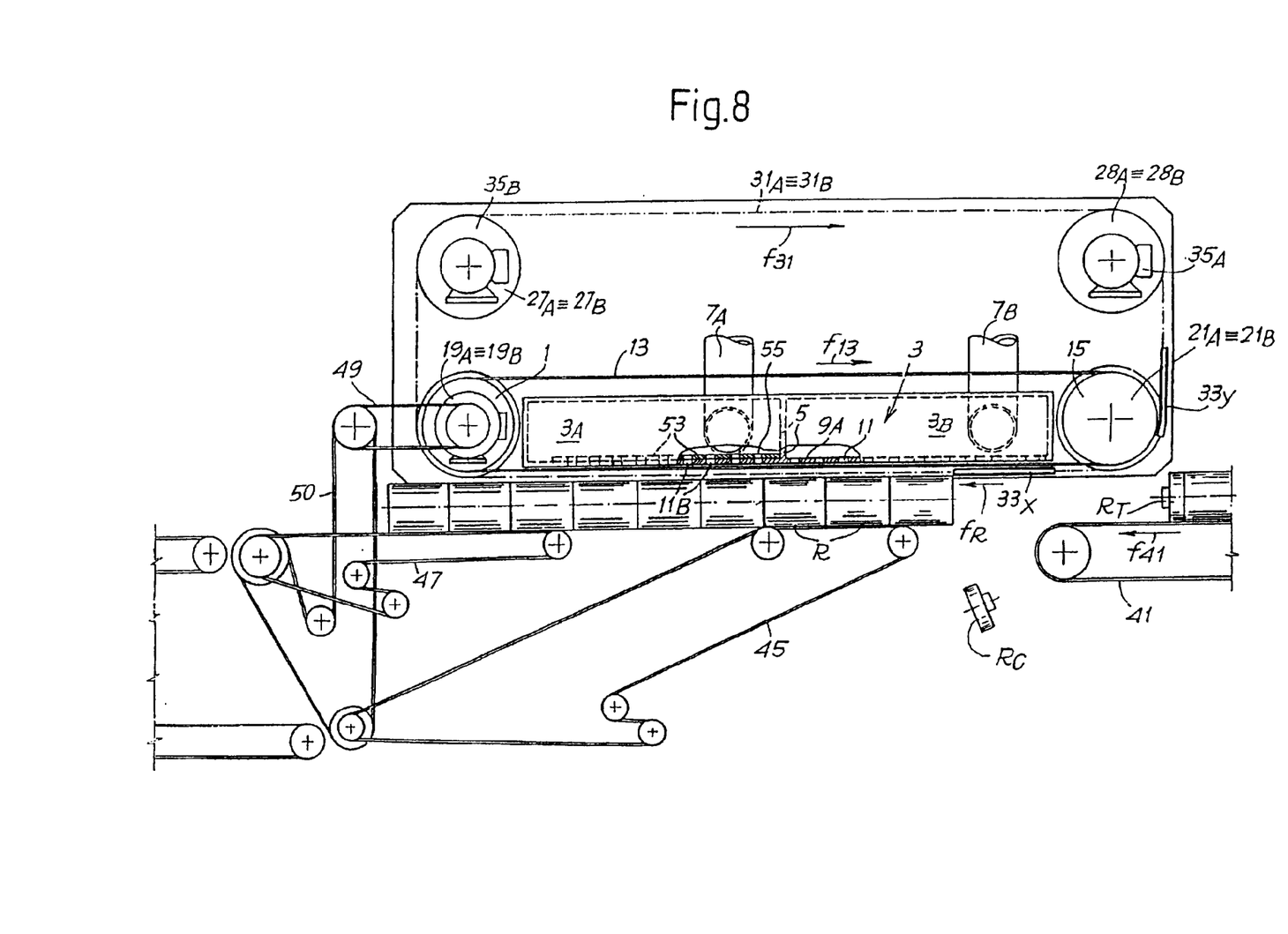

FIG. 7 shows the instant in which the end trimmings RC reach the suction conveyors 13. The two membrane obturators 33X and 33Y are located adjacent to each other, with the front edge of the membrane obturator 33X in a position such as to come into contact with the end trimmings RC. When the end trimmings RC are situated in front of the membrane obturator 33X, the latter begins to move in the direction of feeding of the rolls, at the same speed as the latter, being controlled therein by the respective chains 31A and by the motor 35A. FIG. 8 shows the first phase of movement of the obturator 33X which accompanied the end trimmings RC to the falling zone.

Figure 9:
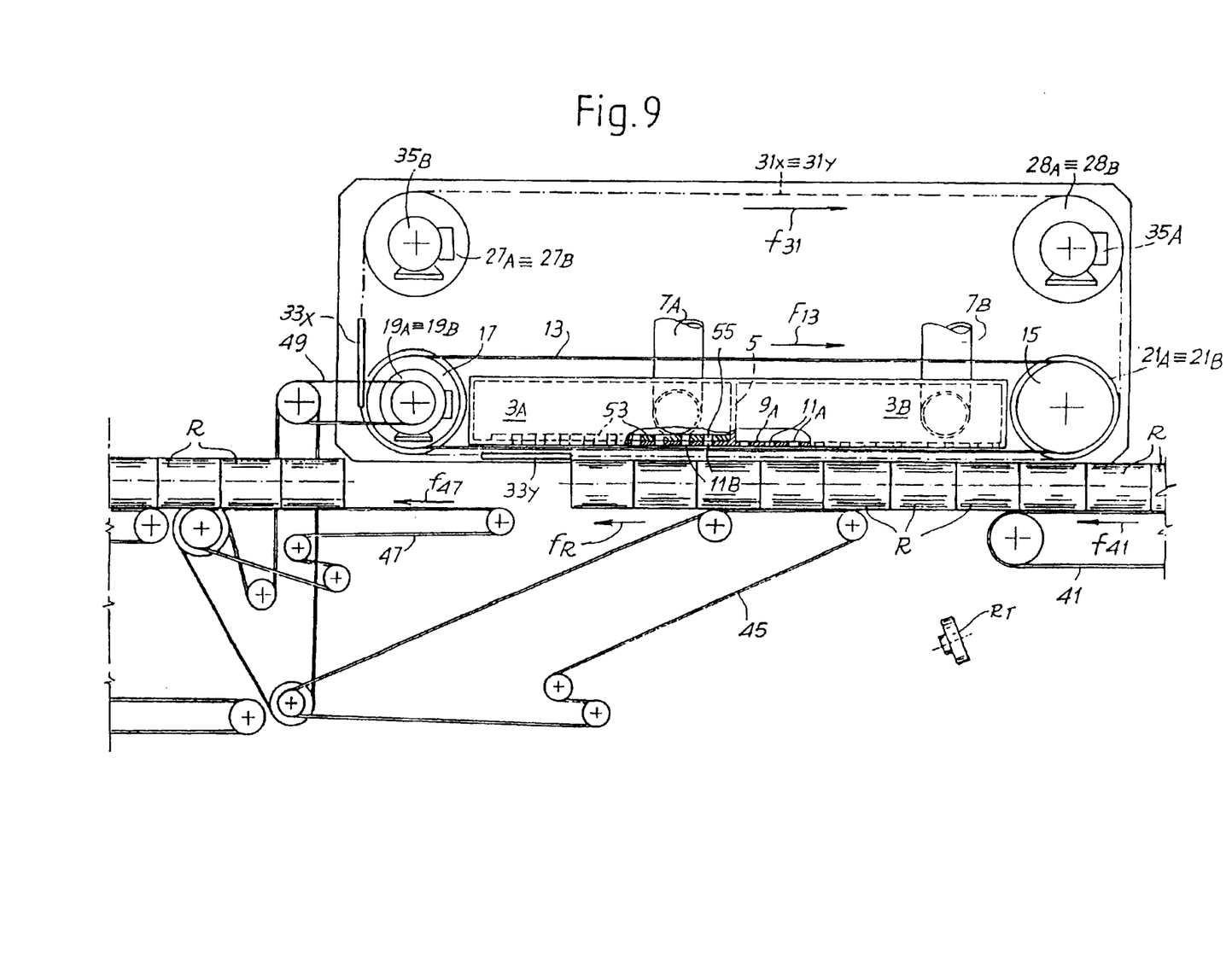
Figure 10:
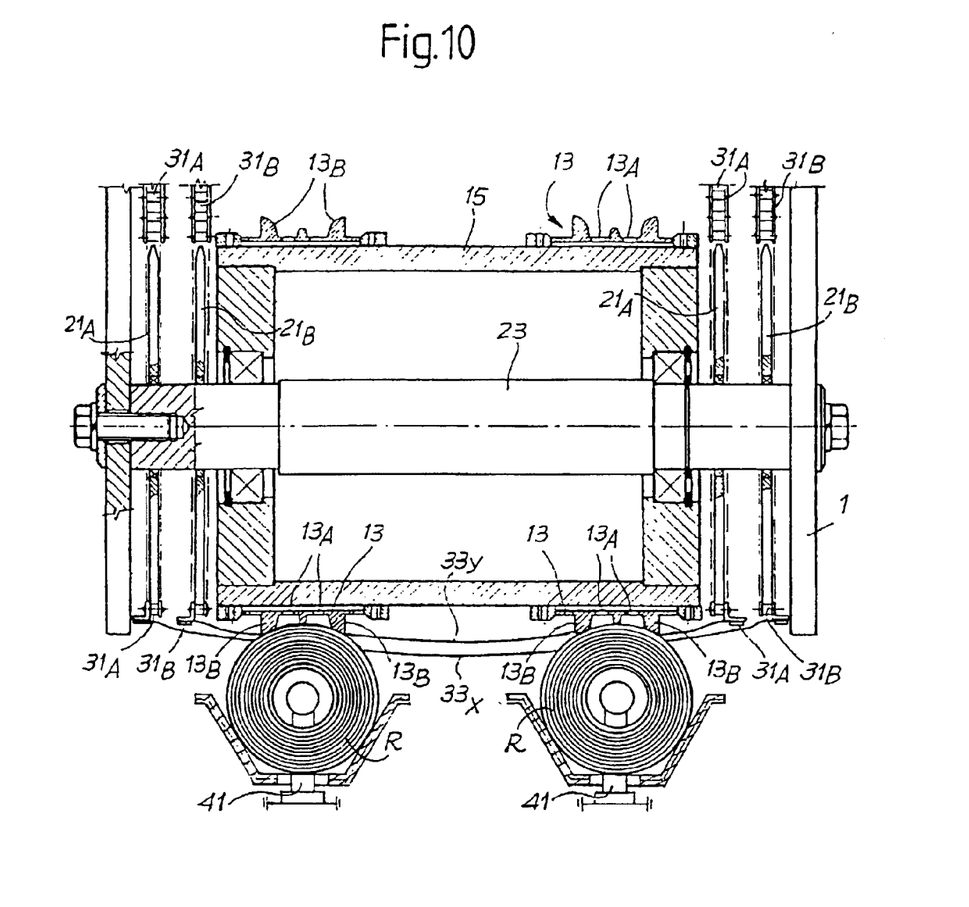

Vice versa, the chains 31B and the membrane obturator 33Y may remain at a standstill. The advancing movement of the membrane obturator 33Y will start in synchronism with the advancing movement of the front trimmings RT of the following series of rolls. FIG. 9 shows the instant in which the obturator 33X has reached and surpassed the pair of wheels 19A, while the membrane obturator 33Y is advancing in front of the first roll of the following series, which has yet to reach the point of separation from the pneumatic retaining system. The membrane obturator 33X may advance to this point at high speed until it reassumes the position shown in FIG. 7 in order to start a following roll discharge cycle, independently of the speed of advancing movement of the membrane obturator 33Y, owing to the use of two independent driving systems for the two obturators.

The substantial advantage which is obtained with this configuration compared to that described previously consists in the fact that the distance between the end trimmings RC and the front trimmings RT may be any and is not dependent upon the longitudinal dimension of the obturators 33X, 33Y. In fact, these two obturators act independently of each other on the end trimmings and on the front trimmings, respectively. Any greater or lesser distance between the end and the front of successive series of rolls is compensated for by simply delaying more or less the start of the movement of the second obturator 33Y with respect to the first obturator 33X. As can be seen from FIGS. 7 to 9, in fact, the distance between the front and end trimmings is greater than the sum of the longitudinal lengths of the two obturators. Nevertheless, having delayed the start of the advancing movement of the second obturator with respect to the first one, it has been possible to discharge both the front trimmings and the end trimmings.

Moreover, since the first obturator 33X, once it has reached the position in which the rolls leave the pneumatic retaining system, is able to advance at a speed greater than and independent of the speed of the rolls, in this configuration it is not necessary to provide on the same pairs of chains several obturators which act alternately in successive operating cycles, as instead envisaged in the preceding configuration. In fact, there is sufficient time for the obturator 33X to position itself again at the working point while the obturator 33Y is still advancing at the (slower) speed of the rolls. Moreover, the active operating phase of the obturator 33X is able to start even before the second obturator 33Y is correctly positioned in the operating position for eliminating the front trimmings of the following series of rolls.

The system thus configured has an even greater flexibility and adaptability to any operating condition, it being possible to program from a keyboard or other suitable interface all the movements of the obturators so as to allow adaptation to any size of the rolls and to any length of the series of rolls as well as to any distance between successive series of rolls.

The example in FIGS. 7 to 9 shows a configuration in which the rolls are sorted onto the flexible conveyor 47, as an alternative to the previous configuration where the conveyor 45 was active. The system for discharging the trimmings may also operate without the means for sorting onto two or more roll sorting and discharge paths, as may the sorting system also operate with a different system for discharging the trimmings.

The device described, when it has both the sorting system and the system for eliminating the trimmings (in either one of the configurations described), allows simple and rapid sorting of the rolls R alternately onto the conveying member 45 or onto the conveying member 47, depending on the requirement in each case in the production cycle. The transition from one of the two flexible conveyor members to the other may be requested, for example, depending on the type of manufactured article fed in each case to the device or depending on the operating conditions of the machines downstream.

It is clear that the concept described here with reference to a system with two flexible conveyor members 45, 47 may be further developed by envisaging three or more flexible conveyor members arranged in series in the direction of feeding fR of the rolls.

The device described also allows easy and rapid adaptation to the various sizes of the series of rolls arriving from the feeder 41.

Contrary to the devices of the prior art, in fact, the zone in which suction through the conveyors 13 is interrupted in order to allow discharging of the trimmings may be positioned as required, being defined by the membrane obturators 33A, 33B or 33X, 33Y. This allows, in addition to a high degree of flexibility, also a considerable limitation of the overall dimensions, since the length of the conveyors 13 on the one hand and of the chains 31 on the other hand are not dependent upon the dimensions of the rolls and upon the overall length of the series of rolls fed to the device, contrary to that which occurs in the devices of the prior art.

The adaptation of the device to the diametral dimension of the rolls is obtained—in a manner known per se—by means of heightwise adjustment of the side walls 1 with respect to the flexible conveyor members 45, 47 and the feeder 41.

It is understood that the drawing shows only a simplification provided by way of a practical demonstration of the invention, the form and dimensions of said invention being able to vary without thereby departing from the scope of the idea underlying said invention.

What is claimed is:

1. A device for removing front and end trimmings in a series of aligned rolls, comprising:
   at least one continuous flexible conveyor;
   a retaining system associated with said conveyor for retaining the rolls on said conveyor;
   a device for eliminating trimmings along a roll transfer path;
   a device for receiving the rolls from said conveyor;
   wherein said device for receiving comprises at least two alternate paths for said rolls, arranged in sequence along said conveyor; and
   wherein said conveyor comprises a sorting system for releasing said rolls alternately to either one of said at least two paths.

2. Device as claimed in claim 1, wherein said device for receiving comprises a first flexible conveyor member defining said first path and a second flexible conveyor member defining said second path.

3. Device as claimed in claim 2, wherein said two flexible conveyor members have a movement with at least one component parallel to the direction of advancing movement of the said conveyor.

4. Device as claimed in claim 3, wherein said first flexible conveyor member has a section approximately parallel to the conveyor and an inclined section which diverges with respect to said conveyor.

5. Device as claimed in claim 4, wherein said inclined section of the first flexible conveyor member extends as far as underneath the second flexible conveyor member.

6. A device for removing front and end trimmings in a series of aligned rolls, comprising:
   at least one continuous flexible conveyor;
   a retaining system associated with said conveyor for retaining the rolls on said conveyor;
   a device for eliminating trimmings along a roll transfer path;

a device for receiving the rolls from said conveyor;
wherein said device for receiving comprises at least two alternate paths for said rolls, arranged in sequence along said conveyor; wherein said conveyor comprises a sorting system for releasing said rolls alternately to either one of said at least two paths;
wherein said conveyor is a suction conveyor, and wherein said retaining system is a suction system associated with said conveyor so as to generate a suction through openings in said conveyor.

7. Device as claimed in claim 6, wherein said device for receiving comprises a first flexible conveyor member defining said first path and a second flexible conveyor member defining said second path.

8. Device as claimed in claim 7, wherein said two flexible conveyor members have a movement with at least one component parallel to the direction of advancing movement of the said conveyor.

9. Device as claimed in claim 8, wherein said first flexible conveyor member has a section approximately parallel to the conveyor and an inclined section which diverges with respect to said conveyor.

10. Device as claimed in claim 9, wherein said inclined section of the first flexible conveyor member extends as far as underneath the second flexible conveyor member.

11. Device as claimed in claim 6, wherein said suction system comprises a first suction member and at least one second suction member arranged downstream of the first suction member with respect to the direction of advancing movement of said conveyor, and wherein said sorting system acts on said at least one second suction member so as to activate or deactivate alternately said at least one second suction member.

12. Device as claimed in claim 11, wherein said first suction member and said at least one second suction member consist of respective portions of a wall along which said conveyor travels and wherein at least the wall portion furthest downstream has, associated with it, a respective intercepting member for intercepting the suction through said wall portion.

13. Device as claimed in claim 6 or 11 or 12, wherein said suction system comprises a suction box with a wall equipped with suction openings, along which said conveyor travels, and wherein said suction openings are divided into at least two groups arranged in succession in the direction of advancing movement of said conveyor, an intercepting member for intercepting said openings of said at least one second group of openings being provided.

14. Device as claimed in claim 13, wherein said suction box is divided into at least one first and one second chamber arranged in series, the openings of said first group communicating with the first chamber and the openings of said second group communicating with the second chamber.

15. Device as claimed in claim 14, wherein a laminar valve is arranged slidably inside said second chamber so as to close the suction openings of said second group.

* * * * *